United States Patent [19]

Horvath

[11] E Re. 30,263

[45] Reissued Apr. 29, 1980

[54] CATCH MECHANISM

[75] Inventor: Stephen Horvath, St. Ives, Australia

[73] Assignee: Access Controls System Pty. Ltd., Melbourne, Australia

[21] Appl. No.: 926,888

[22] Filed: Jul. 21, 1978

Related U.S. Patent Documents

Reissue of:

[64] Patent No.: 4,015,869
Issued: Apr. 5, 1977
Appl. No.: 618,119
Filed: Sep. 30, 1975

[30] Foreign Application Priority Data

Oct. 2, 1974 [AU] Australia ..... PB9139

[51] Int. Cl.[2] ..... E05B 15/02

[52] U.S. Cl. ..... 292/341.16; 292/DIG. 66; 49/7

[58] Field of Search ..... 16/48.5; 49/1, 7, 8; 70/DIG. 10; 292/106, 150, 207, 341.15, 341.16, 341.17, DIG. 66

[56] References Cited

U.S. PATENT DOCUMENTS

| | | | |
|---|---|---|---|
| 1,288,532 | 12/1918 | Drummond | 49/7 X |
| 1,551,687 | 9/1925 | Peelle | 49/7 |
| 2,598,067 | 5/1952 | O'Brien | 292/DIG. 66 |
| 2,767,011 | 10/1956 | Buckley | 292/341.16 |
| 3,094,199 | 6/1963 | Wallmann | 49/1 |
| 3,116,398 | 12/1963 | Welch | 292/DIG. 66 |
| 3,325,941 | 6/1967 | Prucha | 49/7 |
| 3,390,909 | 7/1968 | Nagel | 292/341.16 X |
| 3,705,739 | 12/1972 | Adler | 292/DIG. 66 |
| 3,811,717 | 5/1974 | Floyd et al. | 49/1 X |
| 3,819,215 | 6/1974 | Fuss | 292/341.16 X |

*Primary Examiner*—Lawrence J. Staab
*Attorney, Agent, or Firm*—Biebel, French & Nauman

[57] ABSTRACT

A catch mechanism for installation in a door frame to cooperate with a door lock on a fire door. The mechanism includes a catch member pivotable between an operative position in which to serve as a door catch and an inoperative position to enable release of the door no matter what the condition of the door lock. The mechanism includes a heat responsive locking device which locks the catch member in its catch position in the event of a fire generating high temperatures. The locking device may comprise a biased locking plunger mounted in a cavity within the catch member and normally held in a retracted position by a heat fusible metal plug but extendible on melting of the plug to engage the catch body and so lock the catch member.

10 Claims, 11 Drawing Figures

CATCH MECHANISM

Matter enclosed in heavy brackets [ ] appears in the original patent but forms no part of this reissue specification; matter printed in italics indicates the additions made by reissue.

BACKGROUND OF THE INVENTION

This invention relates to latches and locks and has particular, but not exclusive, application to door latches which can be released by electrical signals. More specifically, the invention has particular application to catch mechanisms of the general type described in our copending Australian patent application No. 73086/74.

Our aforesaid patent application describes a catch mechanism which is designed to be installed in a door frame to cooperate with a conventional door lock and which includes a catch member which can be moved between an operative position in which it can serve the normal catch function and an inoperative position in which to enable release of the door no matter what the condition of the door lock. Such catch mechanisms have particular applications to fire doors and the present invention provides a modified mechanism which will ensure that the door will remain locked in the event of a fire generating very high temperatures.

SUMMARY OF THE INVENTION

According to the invention there is provided a catch mechanism comprising a body; a catch member pivotally mounted on the body to pivot between operative and inoperative positions; actuator means conditionable alternatively to hold the catch member in its operative position or to release the catch member for movement to its inoperative position; and heat responsive locking means operable in response to application of heat thereto when the catch member is in its operative position to lock the catch member in that position.

The invention also extends to the combination of a door frame;

a door swingable within the frame between open and closed positions;

a lock structure mounted on the door and including a lock bolt to project beyond the outer edge of the door; and a catch mechanism mounted on the door frame;

said catch mechanism comprising a body, a catch member mounted on the body so as to be movable between an operative position in which to serve as a catch for the lock bolt to hold the door in the closed position and an inoperative position in which to release the lock bolt, detent means conditionable to hold the catch member in said operative position but releasable to allow the catch member to move to its operative position, power means to control the position of the detent means, and heat responsive locking means operable in response to application of heat thereto when the catch member is in its operative position to lock the catch member in that position.

Preferably, the heat responsive locking means comprises a biased locking plunger mounted in a cavity in either the catch member or the body and held in a retracted position against its bias by a heat fusible retaining element but extendible on fusing of said element to provide locking interengagement between the body and the plunger.

Preferably further, said cavity is in the catch member and there is a recess in the body which is aligned with that cavity when the catch member is in its operative position and which receives a forward end of the plunger when the plunger is extended on fusing of said element.

The bias may be provided by a compression spring located in said cavity.

Said element may be a plug of metal which closes the mouth of said cavity through which the plunger is to be extended. The plug may for example be formed of white metal which fuses at a temperature in the range 300°-900° F.

The actuator means may comprise a lever pivotally mounted on the body and engaged by the catch member so as to be pivoted between first and second positions on movement of the catch member between its operative and inoperative positions; a keeper member mounted on the body so as to be movable between a keeper position in which to engage the lever so as to hold that lever in said first position and a release position in which to permit pivoting movement of the lever; and keeper actuator means to control the position of the keeper member.

In order that the invention may be more fully explained, one particular embodiment will be described in detail with reference to the accompanying drawings.

DESCRIPTION OF PREFERRED EMBODIMENT

Figure 1:
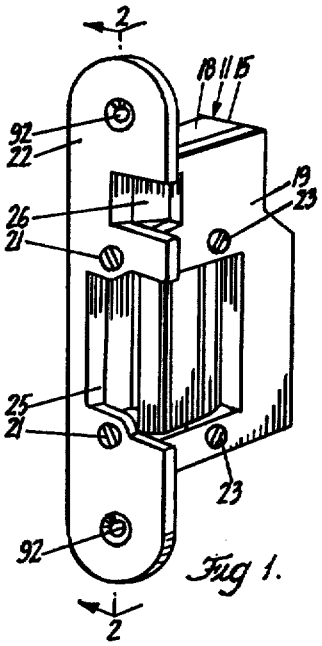
FIG. 1 is a perspective view of a latch mechanism constructed in accordance with the invention.
Figure 6:
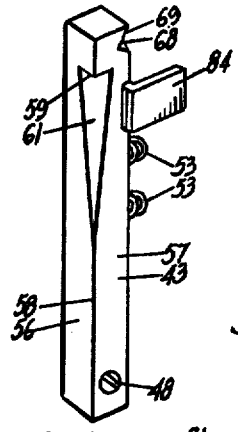
FIG. 6 is a perspective view of a lever from the latch mechanism.
Figure 7:
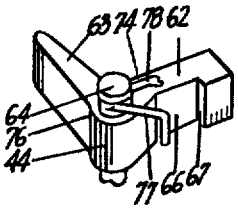
FIG. 7 is a scrap perspective view of a part of the latch mechanism which includes a keeper member.
Figure 8:
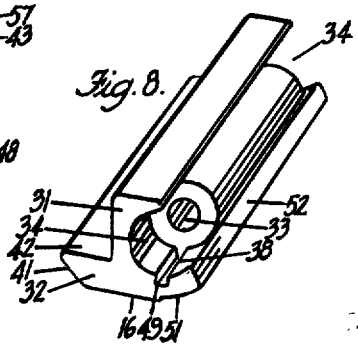
FIG. 8 is a perspective view of a pivoting catch member from the mechanism.

As illustrated by FIGS. 1 to 9 of the drawings, the mechanism is identical to that described in our aforesaid patent application and its mode of operation is the same. However, for the sake of complete disclosure the detailed description of the mechanism is repeated herein.

The mechanism is indicated generally as 11 and is designed for installation in a door frame 12 to cooperate with a conventional dead-lock 13 fitted to a door 14 mounted within the frame. More particularly, mechanism 11 includes a catch member 16 which can cooperate with the spring loaded bolt 17 of the lock 13 to provide a locking function. However, this catch member 16 can be pivoted to an inoperative position so as to release bolt 17 and permit the door to open. The condition of catch member 16 is controlled by an electric solenoid included in the mechanism.

Mechanism 11 has a body 15 comprised of a hollow casing 18 and a front plate 22. Casing 18 includes a removable side plate 19 held in position by screws 23 and it is fastened to front plate 22 by means of screws 21. Body 15 has a lower relatively deep slot 25 to register with the bolt 17 of lock 13 and door 14 swings to its closed position and an upper relatively short slot 26 to register with the dead lock actuator bar 27 of the lock 13 as will be more fully explained below.

Catch member 16 is mounted across slot 25. More particularly, it is pivotally mounted on a pivot pin 28 which traverses slot 25 and extends into holes in casing wall portions 30, 35 which define upper and lower walls of the slot. It is shaped generally as a long bar of L-shaped transverse cross-section, one limb 31 of which is mounted on the pivot pin 28 and the other limb 32 of which serves as the catch for lock bolt 17. Limb 31 has a bore 33 extending through it to receive pivot pin 28 and is counter-bored at each end to provide end recesses 34 to house a pair of torsion springs 36 disposed about pin 28. Springs 36 have short end arms 37 which project into slots 38 formed in the walls of recesses 34 of catch member 16 and rather longer arms 38 which react against the side wall 40 of casing 18. They bias catch member 16 toward the position shown in FIGS. 1, 2 and 4 in which position the flat end surface 45 of its limb 31 abuts the casing side wall 40 to limit pivoting movement and its limb 32 is generally parallel with wall 40 and can serve as a catch for the spring loaded lock bolt 17. This is most clearly illustrated in FIG. 4 in which the phantom lines indicate the position of the door and the lock bolt as the door approaches the fully closed position and the full lines show the position of these components when the door is fully closed. The outer end of limb 32 of the catch member is chamfered to provide a sloping striker face 41 which is struck by the lock bolt as the door is closed to force the lock bolt back against its spring loading. As the door reaches its fully closed position the lock bolt is forced outwardly by its spring loading to locate behind the side face 42 of catch limb 32. At the same time the dead lock actuator bar 27 of the lock enters slot 26 and strikes a ramp surface 55 formed in front plate 22 at the end of the slot so as to be actuated to move the dead lock pin within the lock in the usual manner.

As will be described below catch member 16 can be locked in position so that face 42 of its limb 32 acts as a locking face to prevent opening of the door. However, catch member can be released so that it can be pivoted about pivot pin 28 to allow release of the door in the manner shown in FIG. 5. The locking and release of catch member 16 is achieved through a detent mechanism comprised of a lever 43 and a keeper member 44 which is controlled by means of a solenoid 46.

Lever 43 is in the form of a long bar provided at one end with a bore 48 to receive a pivot pin 47 by which it is pivotally mounted on casing 18. It is disposed within casing 18 immediately behind catch member 16 and it extends longitudinally of the catch member. More specifically, it is arranged to engage the outer corner part 49 of the catch member at the junction between the two limbs 31, 32. This outer corner part of the catch member serves as a cam to engage lever 43 and pivot it about its pivot pin 47 when catch member 16 is pivoted between its operative and inoperative positions. It has a cam surface 51 which is cylindrically curved about the pivot axis of catch member 16 and a leading cam edge 52 which subtends an angle of rather more than 90° to surface 51.

Figure 2:
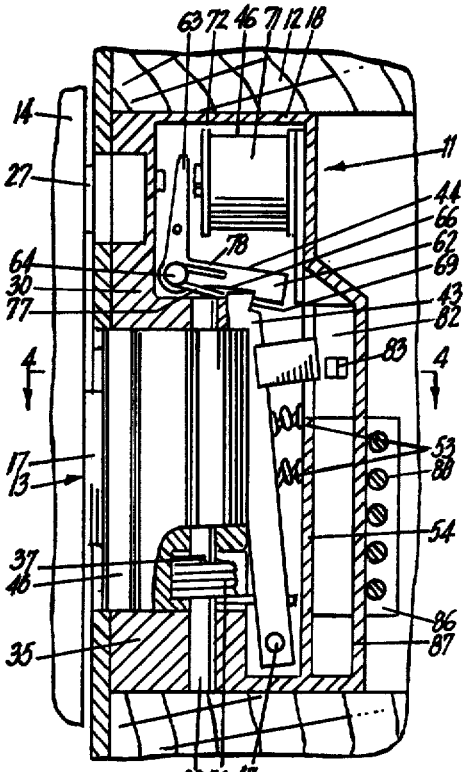
FIG. 2 is a cross-section on the line 2—2 in FIG. 1 taken through the latch mechanism as installed in the frame of a door.
Figure 3:
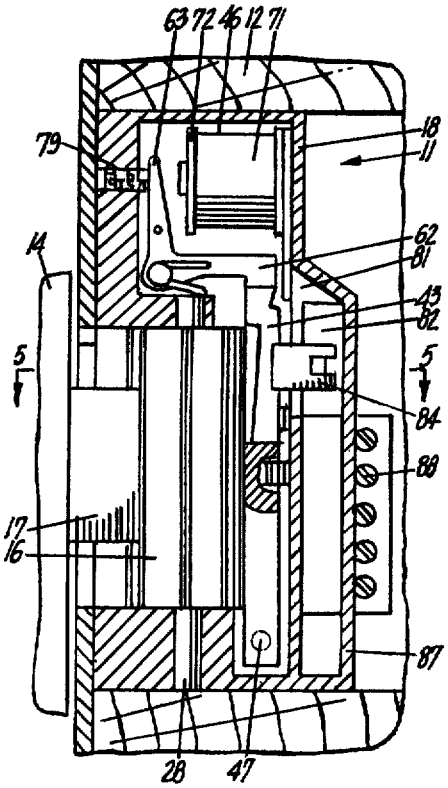
FIG. 3 is a cross-section generally similar to that of FIG. 2 but showing the mechanism in a different condition.
Figure 4:
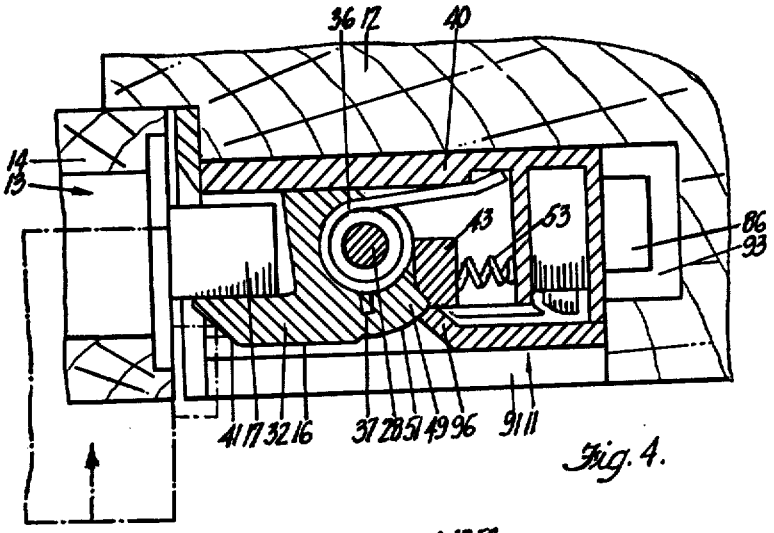
FIG. 4 is a cross-section on the line 4—4 in FIG. 2.

Lever 43 is biased into firm engagement with catch member 16 by two helical compression springs 53 acting directly between the lever and a rear wall portion 54 of casing 18. It is formed from rectangular bar stock so as to have flat front and side faces 56, 57 but one corner edge 58 is relieved by a saw-tooth notch 59 to form a flat triangular cam face 61 which engages the leading cam edge 52 of catch member 16 when the catch member is in its operative position. This condition of the catch member 16 and lever 43 is illustrated by FIGS. 2 and 4. It will be seen that lever 43, although extending generally longitudinally of catch member 16, subtends a slight acute angle to it and its triangular cam face 61 lies flat against an end part of cam edge 52. Keeper member 44 acts to enable lever 43 to be locked in this condition or released according to the supply of electrical signals to solenoid 46.

Keeper member 44 is shaped generally as a bell crank. It has two mutually perpendicular arms 62, 63 and is pivotally mounted on body 18 by a pivot pin 64. Its arm 62 is transverse to lever 43 and has a notch 66 to engage the outer end of the lever so as to provide a detent action holding the lever in the position shown in FIG. 2. Notch 66 is generally of saw-tooth shape to define a sloping catch face 67 and the outer end of lever 43 is notched at 68 so as to be shaped as a tooth having a tooth face 69 to engage the catch face 67 of the keeper arm.

Keeper member 44 may be held in its keeping position shown in FIG. 2 by the action of solenoid 46. This solenoid has a coil 71 wound on a body 72 about a central core 73. It is mounted in casing 18 so that when energized its magnetized core will attract the outer end of actuator arm 63 of keeper member 44 to hold the keeper member in its keeping position.

Its core is connected to a mild steel backing plate 50 which extends close to the outer end of arm 63 so as to direct magnetic flux through the keeper member and thus increase the attractive force of the solenoid. As shown in FIG. 2 a slight clearance is maintained between the solenoid core and arm 63 to prevent sticking when the solenoid is de-energized.

Keeper member 44 is biased away from its keeping position by a biasing spring 74. This spring has a coiled portion 76 looped around the keeper member pivot pin 64 and two end arms 77, 78 which are engaged respectively with the casing 18 and a hole in keeper arm 62.

Figure 5:
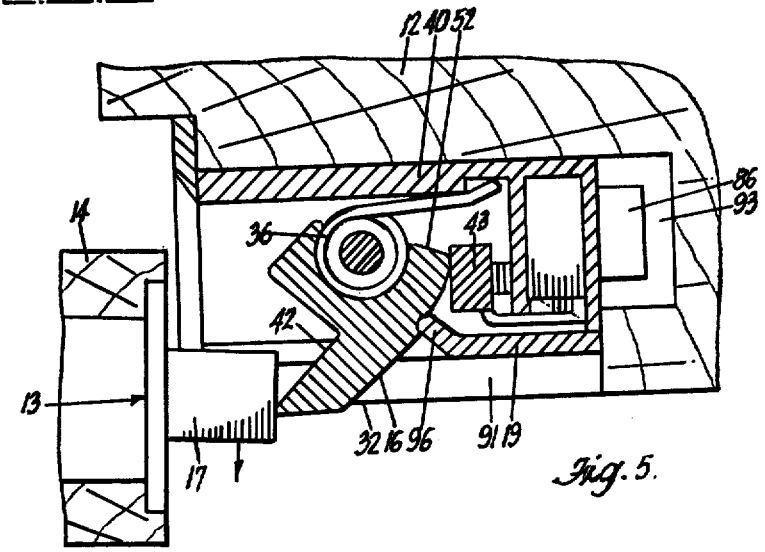
FIG. 5 is a cross-section on the line 5—5 in FIG. 3.

When solenoid 46 is energized it holds the keeper member in its keeping position against the action of biasing spring 74. However, when solenoid 46 is de-energized spring 74 acts to pivot keeper member 44 to the position shown in FIG. 3 in which its actuator arm 63 is held against an adjustable stop screw 74 and its keeper arm 62 is drawn away from keeping engagement with the outer end of lever 43. The only action then holding catch member 16 in its catch position is that provided by springs 53 acting on lever 43. However, because of the cam action between lever 43 and cam portion 49 of the catch member only a light force is needed on catch member 16 to pivot it away from its operative position to force lever 43 back against its biasing springs to the inoperative position shown in FIGS. 3 and 5. At the start of such movement of the catch member its cam edge 52 acts on the triangular cam face 61 of lever 43 to force the lever backwardly against its biasing springs until the cylindrical curved cam surface 51 can engage the flat front face 56 of the lever as shown in FIG. 5.

The rear part of casing 18 has a compartment 81 which houses a micro-switch 82 the actuator 83 of which is engaged by a bracket 84 on lever 43 when the lever is moved consequent to pivoting of catch member 16 to its inoperative position.

Electrical leads from solenoid 46 and micro-switch 82 are connected within casing 18 to a terminal block 86 which is located partly within compartment 82 but extends rearwardly through an opening in the back wall 87 of the casing and is fitted outside the casing with a series of terminals 88 for connection to external wiring.

The catch mechanism illustrated in FIGS. 1 to 8 will operate to hold the door locked for so long as solenoid 46 is energized. By de-energizing the solenoid, catch member 16 is freed and the door can be opened. The mechanism has a wide range of applications. For example it may be used in a fire door installation in order to maintain a fire door in a normally locked condition but to release the door in response to a signal created by a smoke or heat detector acting through any suitable relay to interrupt the supply of power to solenoid 46. In other applications the supply of power to solenoid 46 may be interrupted by operation of a push button located inside a building or by a signal derived from a reader device in response to a magnetically coded key or card. Micro-switch 82 may be used to derive a warning or alarm signal each time that the door is opened.

Figure 9:
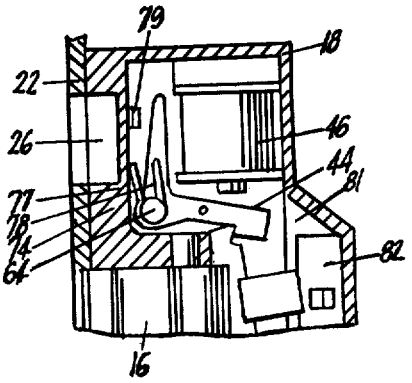
FIG. 9 is a cross-section showing a modification which can be incorporated in the mechanism and is to be contrasted with FIG. 2.

FIG. 9 illustrates a modification by which the mechanism is adapted to keep a door locked when the solenoid is de-energized and releases the door when the solenoid receives an electrical signal. The components of the mechanism are not altered but the setting of spring 74 is altered to bias keeper member 44 toward its keeping position and solenoid 46 is displaced through 90° from its previous position so as to act directly on keeper arm 62 rather than on arm 63 of the keeper member. The re-setting of biasing spring 74 involves insertion of its arm 77 in a hole drilled in arm 63 instead of in the hole in arm 62 and the other spring arm 78 acts against a different part of casing 18. In this case keeper arm 62 is normally held by spring 76 in keeping engagement with the upper end of lever 43 by the action of spring 74 but is lifted to free the lever when solenoid 46 is energized. Stop screw 79 is set to engage arm 63 of keeper member 44 before arm 62 can engage the solenoid core so that even when the solenoid is energized there will be a slight clearance between its core and arm 62.

Mechanism 11 is set into a recess 91 in door frame 12 and may be held in position by conventional wood screws passed through counter-sunk holes 92 in front plate 22. A groove 93 may be formed in the door frame to receive the projecting part of terminal block 86 and the external wiring.

As shown in FIGS. 4 and 5 side plate 19 of casing 18 has an inturned lip 96 which abuts cam surface 51 of catch member 16 and as the catch member pivots the cylindrical surface 51 simply slides on lip 96. Thus, contact is maintained between catch member 16 and lip 96 at all times to seal off the interior of the casing and prevent tampering by insertion of an instrument between the catch member and the casing.

Figure 10:
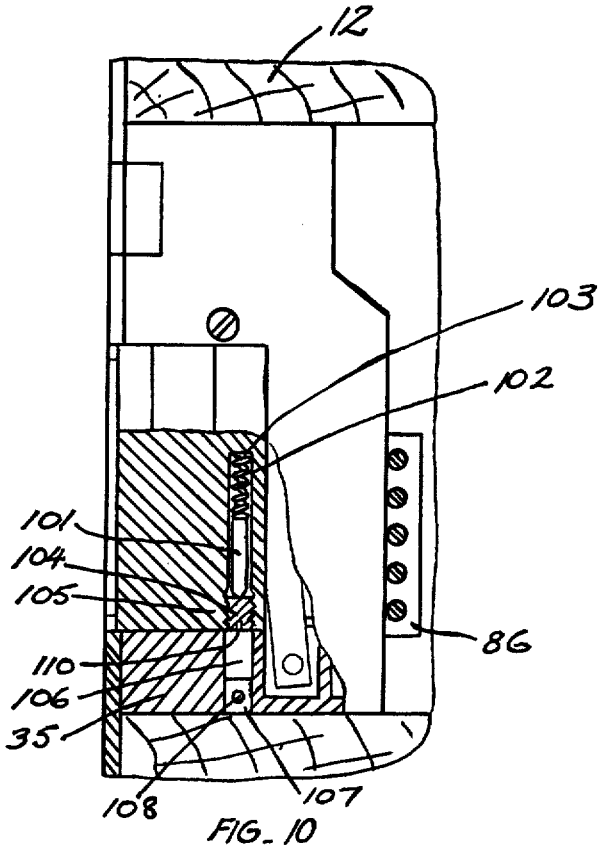
FIG. 10 is a partly sectioned elevation of the mechanism showing in particular the heat responsive locking means incorporated in the mechanism in accordance with the present invention.
Figure 11:
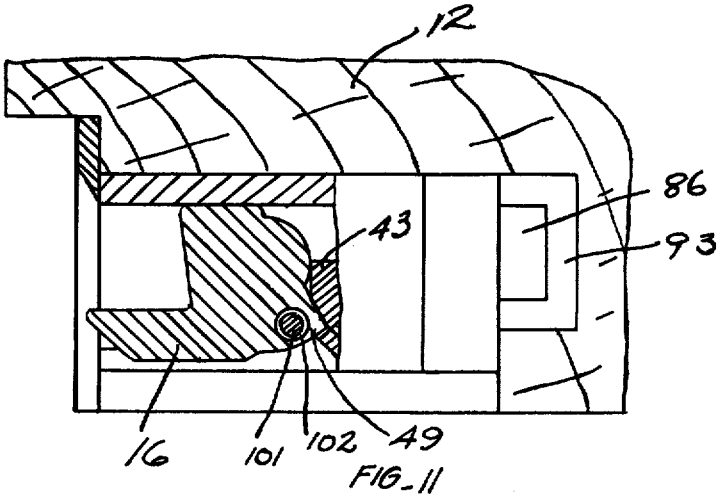
FIG. 11 is a partly sectioned end elevation of the mechanism.

FIGS. 10 and 11 show the heat responsive locking means which is incorporated in the mechanism in accordance with the present invention. This locking means comprises a stainless steel pin or plunger 101 which is located within a cavity 102 in catch member 16 and is biased by a helical compression spring 103 located within the cavity. Cavity 102 is in the form of a deep cylindrical hole drilled in the outer corner part 49 of catch member 16 to extend parallel with the pivot axis of the catch member. It has an enlarged mouth 104 at one end of the catch member and this mouth is closed by a plug 105 of white metal which will melt at a selected temperature. The enlarged mouth of the cavity may be internally screw threaded and the plug may be in the form of a white metal grub screw with a driving slot 110 to screw into the threaded mouth.

In normal service of the mechanism plug 105 retains plunger 101 within cavity 102 with biasing spring 103 held in a compressed condition. The casing wall portion 35 of the body 15 is provided with a recess 106 at such a location that it registers with the plugged cavity 102 of the catch member when the catch member is in the operative position shown in FIGS. 1 and 4. Recess 106 may be formed by drilling a hole through casing wall portion 35 and then plugging the outer end of this hole with a plug 107 held in place by a transverse pin 108.

During normal service of the mechanism the locking means illustrated in FIGS. 10 and 11 is inoperative. However, plug 105 has a much lower fusing temperature than the other parts of the mechanism such as the body 15, catch member 16 and plunger 101 which may all be made of high melting temperature steels. Thus, if a fire should occur and cause heating of the mechanism, plug 105 will melt at such a stage that plunger 101 will be extended under the influence of biasing spring 103 to enter recess 106 in casing wall portion 35 and so provide locking interengagement between catch member 16 and the body of the mechanism. The catch member will then be locked in the operative or locking position regardless of the electrical or physical condition of the other components of the mechanism.

The composition of white metal plug 105 is chosen to have a fusing temperature appropriate to the particular application. This temperature will generally be in the range of 300°–900° F. so that when the plug melts there would normally be no survivors within the space closed by the fire door. Thus, the design will be such that the mechanism can be released electrically to open the door during conditions when people may have to escape through the door but the catch member subsequently becomes permanently locked in position even should the electrical components be burned out and the lever and keeper mechanism be damaged. The dead lock 13 can, of course, always be operated manually to provide for emergency exit.

Since the mechanism is designed to be used with fire doors, casing 18 and front plate 22 are both constructed of stainless steel. Catch member 15 is an investment casting of non-magnetic stainless steel. Lever 43 is also made of non-magnetic stainless steel and keeper member 44 is made of a magnetic steel.

The illustrated mechanism has been advanced by way of example only and it could be modified considerably. For example, although the illustrated arrangement of a lever and keeper arm is preferred in order to allow a very compact and robust mechanism other actuator means are possible. Australian patent specification No. 426,474 describes one alternative in which a lever which normally holds the catch member in its operative position is acted on directly by an electromagnet. It is to be understood that the heat responsive locking means of the present invention may be fitted to such mechanisms and accordingly that many variations will fall within the scope of the appended claims.

I claim:

1. A door catch mechanism comprising a body; a catch member pivotally mounted on the body to pivot between an operative position and an inoperative position; biasing means biasing the catch member toward its operative position; power operated detent means having a first condition in which said catch member is held in said operative position and a second condition in which said catch member is released such that it can be moved to its inoperative position against the action of said biasing means by a moving force applied directly to the catch member from without the catch mechanism; and heat responsive locking means operable in response to application of heat thereto when said catch member is in its operative position to lock the catch member to remain permanently in said operative position regardless of the condition of the detent means.

2. A catch mechanism as claimed in claim 1, wherein the heat responsive locking means comprises a biased locking plunger mounted in a cavity in said catch member, and a retaining element for holding said plunger in a retracted position against its bias; said retaining element being heat fusible at a temperature in the range of 300° to 900° F. which temperature is lower than the fusing temperature of said body, said catch member and said plunger, and said plunger being extendable on fusing of said retainer element to provide locking interengagement between the body and the plunger.

3. A catch mechanism as claimed in claim 2, wherein said retaining element is a plug of heat fusible material which closes the mouth of said cavity through which said plunger is extended on fusing of the plug.

4. A catch mechanism as claimed in claim 2, wherein there is a recess in said body which is aligned with said cavity when said catch member is in its operative position and which receives the forward end of said plunger when said plunger is extended on fusing of said retainer element.

5. A catch mechanism comprising a body; a catch member pivotally mounted on the body to pivot between an operative position and an inoperative position; biasing means biasing said catch member toward its operative position; power operated detent means having a first condition in which to hold said catch member in said operative position and a second condition in which said catch member is released such that it can be moved to its inoperative position by a force applied directly to the catch member to overcome the action of said biasing means; a locking plunger disposed within a cavity in said catch member, which cavity has an internally screw-threaded mouth; an externally screw threaded plug of heat fusible material screwed into said internally screw-threaded mouth; an externally screw threaded plug of heat fusible material screwed into said internally screw threaded mouth of said cavity to plug said mouth of said cavity; and a biasing element within said cavity to bias said locking plunger against said plug; said plug being heat fusible at a temperature which is lower than the fusing temperature of said body, said catch member and said plunger to cause said plunger to be extended under the influence of said biasing element to provide locking interengagement between the body and the plunger whereby to lock said catch member to remain in its operative position regardless of the condition of the detent means.

6. A catch mechanism as claimed in claim 5, wherein there is formed in said body a recess which is aligned with said cavity when said catch member is in its operative position so that on fusing of said plug said locking member is extended by said biasing element to project into said recess in said body.

7. The combination of a door frame;

a door swingable within the frame between an open position and a closed position;

a lock structure mounted on the door and including a lock bolt having an extended position in which it projects beyond the outer edge of the door; and a catch mechanism mounted on the door frame, such catch mechanism comprising a body; a catch member mounted on said body and movable between an operative position in which said lock bolt is engaged and said door is held in the closed position and an inoperative position in which said lock bolt is released; biasing means biasing said catch member toward its operative position; power operated detent means having a first condition in which to hold the catch member in said operative position and a second condition in which to free the catch member such that it can be moved to its inoperative position against the action of said biasing means, thereby permitting said door to open; and heat responsive locking means to lock the catch member permanently in said operative position in response to application of sufficient heat thereto when said catch member is in its operative position.

8. The combination of claim 7, wherein said heat responsive locking means comprises a biased locking plunger mounted in a cavity in said catch member and a retaining element for holding said plunger in a retracted position against its bias, said retaining element being heat fusible at a temperature in the range of 300° to 900° F., which temperature is less than the fusing temperture of said body, said catch member and said plunger; said plunger being extendable on fusing of said retaining element to provide locking interengagement between the body and the plunger.

9. The combination of claim 8, wherein there is a recess in said body which is aligned with said cavity when said catch member is in its operative position and which recess receives the forward end of said plunger when said plunger is extended on fusing of said element.

10. The combination claimed in claim 8, wherein said retaining element is a plug of metal plugging the mouth of said recess through which the plunger is extended on fusing of said plug.

* * * * *